United States Patent Office.

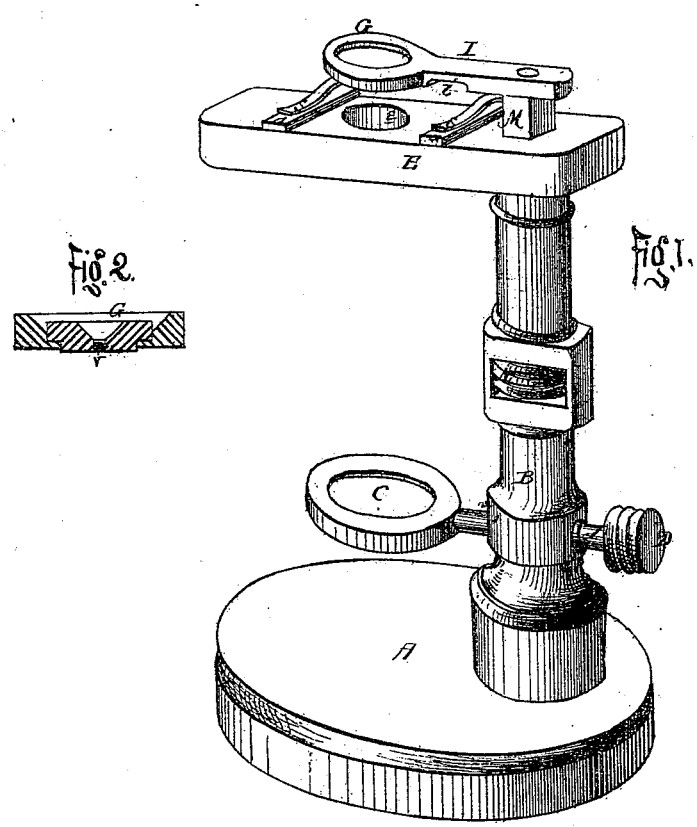

JAMES H. LOGAN, OF ALLEGHENY, PENNSYLVANIA.

Letters Patent No. 93,895, dated August 17, 1869.

IMPROVEMENT IN SINGLE MICROSCOPES.

The Schedule referred to in these Letters Patent and making part of the same.

*To all whom it may concern:*

Be it known that I, JAMES H. LOGAN, of the city and county of Allegheny, and State of Pennsylvania, have invented a new and improved Microscope; and I do hereby declare that the following is a full, clear, and exact description of the construction and operation of the same, reference being had to the accompanying drawings, making a part of this specification, in which—

Figure 1 is a perspective view.

Figure 2 is a section through the lens-holder.

In this improved microscope every part, except the lens-screw, clips, and reflecting-surface of the mirror, is made of wood.

The main features of the invention consist in the general construction and arrangement of the parts, whereby it is possible to make them all of wood, without sacrificing strength and efficiency, together with a new and improved method of effecting the focal adjustment, and the peculiar adaptation of the microscope to the convenient and efficient use of globule-lenses.

In the drawings—

A is a circular base.

B, an upright standard, supported by the base A.

C, a mirror, near the lower end of the standard, to which it is connected by an arm, $d$, having a head, D, by which it can be turned and adjusted so as to reflect the light upon the object to be inspected.

E is a horizontal platform or stage, fixed to the top of the standard, and having a vertical aperture, $e$, through it, directly over the centre of the mirror.

$a\ a$ are flat pieces, fixed to the upper surface of the platform or stage E, on each side of the opening $e$, to support the transparent plate to which the specimen or object is attached, and give a better hold for the fingers in moving it about.

$s\ s$ are spring-clips, which press down upon the object-plate, and hold it in place upon the pieces $a\ a$.

G is the lens-holder, supported directly over the aperture $e$, by means of a horizontal arm, I, attached to the top of a vertical rod, M.

The latter rod works up and down in a socket or covered vertical groove, in the centre of standard B, its lower end having an iron screw fitted in it, and operating in connection with a nut, N, by turning which the rod can be raised or lowered, and the lens adjusted at the proper focal distances from the object. The rod above the screw may be square or polygonal in shape, fitting into a socket of similar shape, so as not to turn with the nut A.

A portion of the under side of the lens-holder, or of the arm I, is cut away, as seen at $i$, in order that the spring-clip may not come in contact with it when it is depressed, and thereby prevent the lens from being brought very near the object, as is necessary when high powers are used. That part of the stage E through which the rod M passes, is lined with leather, moistened with oil, whereby the lens-holder is kept free from any lateral movement while the focal adjustment is being made. This, however, may not be necessary, if the bar fits the opening very accurately.

The lenses $r$, may be made very easily and cheaply, by cutting off a narrow strip of perfectly transparent French plate-glass, drawing it out into a thread in the flame of a spirit-lamp, and then holding one end of the thread in the flame until it melts and runs into a globule. The globule is arranged in the holder with the broken end of the thread on one side, so as not to interfere with the proper passage of the light through the lens. Any other species of lens may be used instead of that here described.

The hole in the disk or lens-holder, which receives and holds the globule, should be burned in, and then cleaned, by pressing a small piece of wood into it, and turning the same to ream it out.

Although this microscope may be made of metal, if preferred, yet it answers perfectly well, in every respect, if made of wood. Hard, dark-colored woods are best, such as black walnut, mahogany, or rosewood, &c. It may also be made of rubber, or of suitable combinations of the before-mentioned materials.

Its cost, when made of such materials, is very slight, and it may be readily and easily made, lens and all, by any person of ordinary mechanical skill, who has a lathe and other necessary tools.

Having thus described my invention, I do not claim any specific part of the same as new, when considered independently of the other parts, or independently of the general construction of the whole; but

What I do claim as an article novel in construction, and of great utility in its adaptation to the purposes described, is as follows:

A simple microscope, having the base A, standard B, mirror C, attached to the standard by the arm $d$, and capable of being turned by the head D, arm E, having the aperture $e$, nut N, screw-rod M, arm I, lens-holder G, bars $a\ a$, springs $s\ s$, and globule-lens $r$, when all said parts, except mirror C, springs $s\ s$, and lens $r$, are made of wood, and all are constructed, arranged, and combined in the manner substantially as described.

JAMES H. LOGAN.

Witnesses:
CHAS. A. PETTIT,
S. C. KEMON.